United States Patent [19]

Ishii et al.

[11] Patent Number: 5,157,732
[45] Date of Patent: Oct. 20, 1992

[54] MOTION VECTOR DETECTOR EMPLOYING IMAGE SUBREGIONS AND MEDIAN VALUES

[75] Inventors: Hirofumi Ishii, Moriguchi; Atsushi Morimura, Nara, both of Japan

[73] Assignee: Matsushita Electric Industrial Co., Ltd., Osaka, Japan

[21] Appl. No.: 769,521

[22] Filed: Oct. 2, 1991

Related U.S. Application Data

[63] Continuation-in-part of Ser. No. 493,426, Mar. 14, 1990, abandoned.

[30] Foreign Application Priority Data

Mar. 20, 1989 [JP] Japan .................................. 1-068205

[51] Int. Cl.⁵ .......................... G06K 9/00; G06K 9/48; H04N 7/18; H04N 7/12
[52] U.S. Cl. ........................................... 382/1; 382/21; 358/105; 358/136
[58] Field of Search ......................... 382/1, 21, 42, 19; 358/105, 136, 133

[56] References Cited

U.S. PATENT DOCUMENTS

| 4,661,853 | 4/1987 | Roeder et al. | 358/105 |
| 4,771,331 | 9/1988 | Bierling et al. | 358/136 |
| 4,862,260 | 8/1989 | Harradine et al. | 358/105 |
| 4,890,160 | 12/1989 | Thomas | 358/105 |
| 4,924,310 | 5/1990 | von Brandt | 358/105 |

FOREIGN PATENT DOCUMENTS

| 61-113376 | 10/1986 | Japan . |
| 61-269475 | 4/1987 | Japan . |
| 2144301 | 2/1985 | United Kingdom . |

Primary Examiner—David K. Moore
Assistant Examiner—Michael Cammarata
Attorney, Agent, or Firm—Stevens, Davis, Miller & Mosher

[57] ABSTRACT

An image motion vector detection apparatus effectively reduces influences of false vectors arising at a certain probability and suppresses time lags. An image fluctuation stabilizer highly stabilizes images or frames without causing unnatural visual feelings. An image motion vector detection apparatus comprises means for detecting motion vectors in each of motion vector detection regions defined in the whole or part of picture frame, means for judging the reliability of the motion vector in each region, and signal processing means which, in obtaining a motion vector of the whole or part of the frame from the motion vectors of the regions and in case the number of motion vectors judged to be reliable is more than or equal to a predetermined number, outputs a representative value of a set of the reliable motion vectors as a motion vector of the frame.

12 Claims, 8 Drawing Sheets

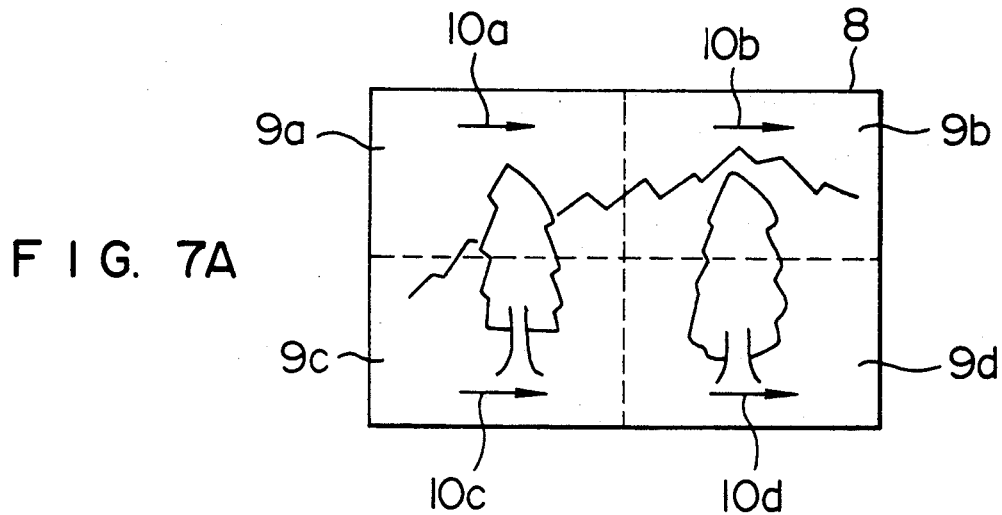
F I G. 7A
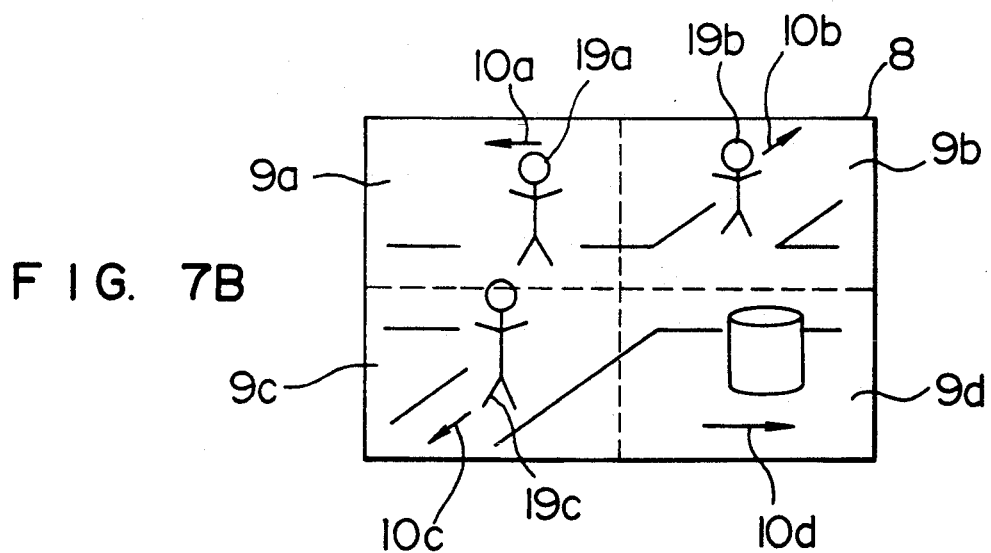
F I G. 7B

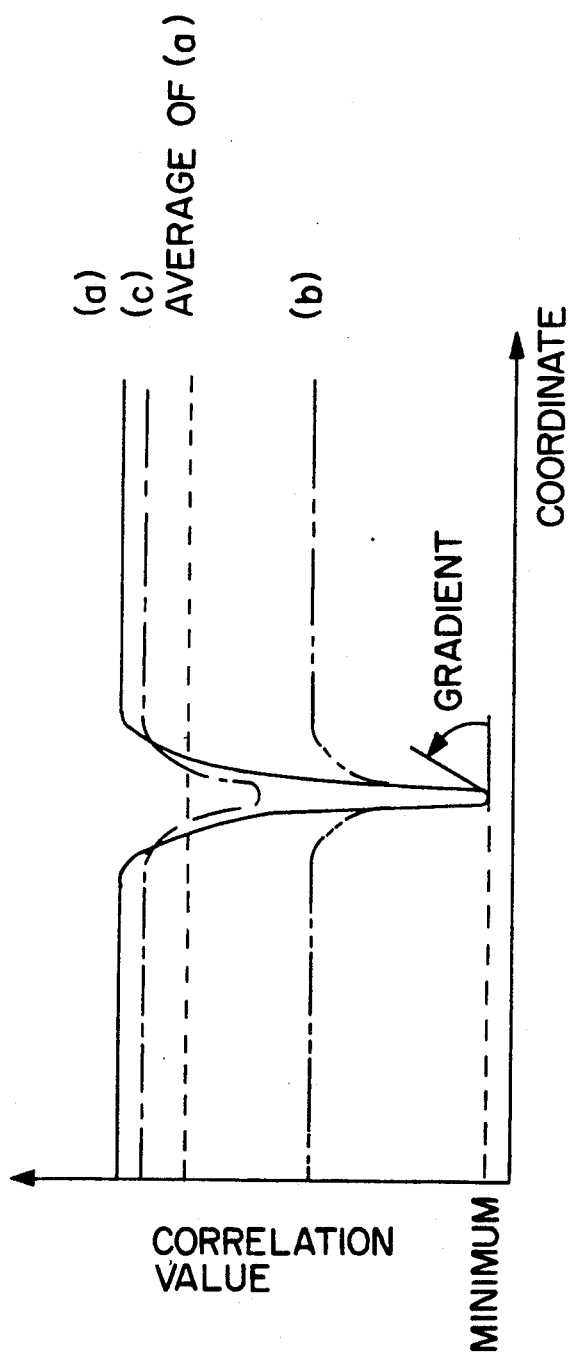

MOTION VECTOR DETECTOR EMPLOYING IMAGE SUBREGIONS AND MEDIAN VALUES

This application is a continuation-in-part of application Ser. No. 07/493,426, filed Mar. 14, 1990 now abandoned.

BACKGROUND OF THE INVENTION

This invention relates to motion vector detection for image and processing of image for stabilization against fluctuations caused, for example, due to possible unintentional or uncontrolled movement or shaking of a television camera recording the images.

Recently, a motion vector detection for device an image and a smoothing signal processing apparatus have been disclosed in Japanese Patent Unexamined Publication No. 61-107886.

The following explains the conventional motion vector detection device for images and smoothing signal processing apparatus. FIG. 1 is a block diagram of the motion vector detection apparatus which uses a conventional motion vector smoothing circuit for images. FIG. 2 is a diagram used to explain the operation of the apparatus. In FIG. 1 numeral 1 is an image signal input terminal, 2 is a representative point memory which stores signals of pixels on representative points in the entered image signal, and 3 is a differential-absolute value converter which produces the absolute value of the difference of the inputs. Reference numeral 4 is an accumulating adder, 5 is a minimal point detection circuit, 6 is a selection means, and 7 is a motion vector smoothing means. In FIGS. 7A and 7B, 8 is a frame, 9a-9d are motion vector detection regions, and 10a-10d are motion vectors detected in the respective regions.

The operation of the conventional image motion vector detection apparatus arranged as described above is as follows. First, an image signal which is continuous in the time domain is entered to the input terminal 1. The representative point memory 2, for which a plurality of representative points in the detection regions 9a-9d of the frame 8 are determined in advance, stores signals of pixels on the representative points according to the input image signal. The differential-absolute value converter 3 evaluates the absolute value $|\Delta L|$ (i,j) of the difference between the signal at the position of a representative point in a field just preceding to a present precedent field and the signal at the position with a displacement (by i in the horizontal direction and j in the vertical direction) from the representative point of the present field. The accumulating adder 4 includes a table of displacements (i, j) for the detection regions 9a-9d, and it performs cumulative addition for the signal from the differential-absolute value converter 3 separately for each displacement (i, j). The result is termed a correlation value $\Sigma |\Delta L|$ (i,j) for displacement (i,j). The minimal point detection circuit 5 detects a displacement (i',j') which provides the minimum value of the correlation values, and it delivers the values as motion vectors 10a-10d in the detection regions 9a-9d. The selection means 6 provides a motion vector of the whole field or whole frame image (which is hereinbelow abbreviated as "whole frame image" from the motion vectors 10a-10d in all detection regions. The motion vector smoothing means 7 produces a value, which is smoothed in the time domain, of the motion vector provided in each field on the basis of the following equation.

$$Vo(k) = W(k) \times Vi(k) + (1 - W(k)) \times Vo(k-1)$$

(where Vi(k) is the input motion vector of the k-th field, Vo(k) is the output motion vector of the k-th field, and W(k) is a weighting factor of the k-th field).

The operation is to implement the smoothing process for the motion vector in the time axis direction so that, in case the motion vector of the whole frame image detected by the selection means 6 is a false vector, the discontinuity of motion vectors in the time domain due to the false vector is reduced thereby to improve the property of visibility in case a so-called motion correction is conducted.

The W(k) takes as a value of 1 in a case of scene changes so as to follow a quick change, and takes a value of about ⅛ in a steady state so as to have an increased noise elimination effect.

However, when the motion vector detection apparatus using the conventional image motion vector smoothing circuit is used for the stabilization of fluctuated images or frames, the following problems arise.

The stabilization of fluctuated images is implemented in such a procedure of storing a field of image signal in the memory in advance while detecting a motion vector of the whole frame image of a field immediately precedent to a current field, and shifting or changing the memory read-out position (i.e., image position in the picture frame) in a direction of motion correction for each field.

Accordingly, the memory read-out position is determined, in principle, from the integrated value of detected motion vectors. The following explains a fluctuation stabilizing operation by the motion vector detection apparatus using the conventional image motion vector smoothing circuit with reference to FIGS. 3(a), 3(b) and 3(c). FIG. 3(a) shows an error in case the motion vector of the whole frame image in one field detected by the selection means 6 was a false vector, and FIG. 3(b) shows an error created then at the output of the vector smoothing means 7. FIG. 3(c) shows an integrated error as a result of the integration operation.

In one field, in case the motion vector of the whole frame image detected by the selection means 6 is a false vector and an error 20 shown in FIG. 3(a) arises, the discontinuity in the time domain of motion vectors due to the false vector is reduced as shown in FIG. 3(b). The cumulative error caused in the integrated value of the detected motion vectors does not have its final integration error 21 reduced as shown in FIG. 3(c) since the error of the arising false vector is merely smoothed over several fields. For this reason, the fluctuation stabilization is directly affected by the error of such a false vector, resulting a malfunctioning such as a shift of the stabilization image in the direction opposite to that of the error.

The smoothing operation creates a time lag in the motion vector, and therefore only low frequency components of fluctuations are stabilized with its high frequency components being left nonstabilized, giving rise to unnatural perceptual feelings to viewers.

As described above, the motion vector detection apparatus using the conventional image motion vector smoothing circuit, when used for the stabilization of fluctuated images, involves such deficiencies as faulty operations and unnatural perceptual feelings given to viewers.

SUMMARY OF THE INVENTION

This invention is intended to solve the foregoing prior art problems, and its object is to provide an image motion vector detection apparatus which effectively reduces influences of errors of false vectors arising at a certain probability and suppresses the occurrence of time lags, and an image fluctuation stabilizer which produces a highly stabilized image without causing unnatural visual feelings to viewers.

The image motion vector detection apparatus of this invention comprises means for detecting motion vectors in a plurality of motion vector detection regions in the whole or part of a field or frame, and signal processing means which, with a detection of a number of motion vectors judged to be reliable in the detection regions more than or equal to a specified number, produces a representative value of such reliable motion vectors as a motion vector of the whole or part of the field. In other words, the term "reliable vector" as used throughout the present text denominates a motion vector of the whole frame image not affected by partial motions of the image.

A basic object of the present invention is to provide a technique of comparing image signals between two fields and detecting an image motion vector of an entire display vectors, there may be occasionally detected image motion vectors (error vectors) which are different from a vector representative of motion of the entire display image. Such error vectors may result due to influences of noise or moving objects having motion different from that of the entire image. The possibility or frequency of occurrence of detection of such error vectors can be estimated by checking parameters detected in the detection process. The present disclosure denominates as "reliable vectors" those vectors determined to have low probabilities of being error vectors among the detected motion vectors. The disclosure also denominates as a "reliability judgment means" a means for estimating the probability of detecting motion vectors as error vectors, thereby judging or determining if the vectors are reliable.

BRIEF DESCRIPTION OF THE DRAWINGS

FIGS. 7a and 7b are diagrams explaining the operation of the image fluctuation stabilizer based on the third embodiment of this invention;

FIG. 8 is a diagram showing change of correlation value with change of coordinate in a representative point matching method.

DESCRIPTION OF THE PREFERRED EMBODIMENTS

Figure 4:
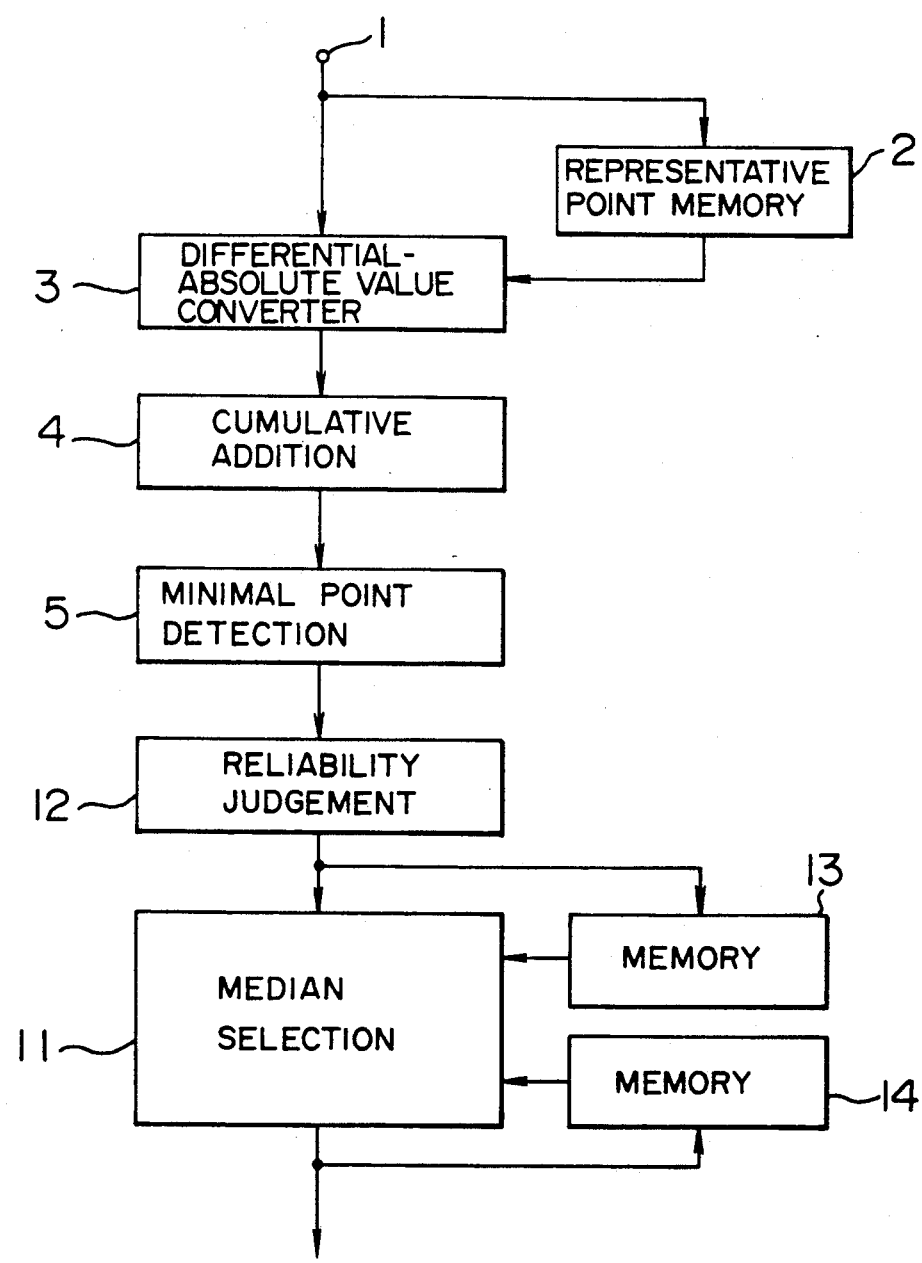
FIG. 4 is a block diagram of an image motion vector detection apparatus based on the first embodiment of this invention.

FIG. 4 is a block diagram of the image motion vector detection apparatus based on the first embodiment of this invention. In FIG. 4, indicated by 1 is an image signal input terminal, and 2 is a representative point memory, which stores signals of pixels at representative points in the entered image signal. Numeral 3 is a differential-absolute value converter, which produces the absolute value of the difference of inputs. Numeral 4 is a cumulative adder, 5 is a minimal point detection circuit, and 11 is a median selection means. 12 is a reliability judgment means, and 13 and 14 are memories.

The operation of the image motion vector detection apparatus based on the first embodiment of this invention arranged as described above is as follows. First, an image signal which is continuous in the time domain enters to the input terminal 1. For the representative-point memory 2, a plurality of representative points in the detection regions 9a-9d of the frame 8 are determined in advance, and memory 2 stores signals of pixels at the positions of representative points in the input image signal. The differential-absolute value converter 3 evaluates the absolute value $|\Delta L|$ (i,j) of the difference between the signal at the position of a representative point in a field just precedent to a current or present field and the signal at the position with a displacement (by i in the horizontal direction and j in the vertical direction) from the representative point of the present field. The cumulative adder 4 includes a table representative of displacements (i,j) in the detection regions 9a-9d, and it accumulates signals from the differential-absolute value converter 3 separately for each displacement (i,j) to produce a correlation value $\Sigma |\Delta L|$ (i,j) for a displacement (i,j). The minimal point detection circuit 5 detects a displacement (i',j') which provides the minimum value of the correlation values, and delivers it as a motion vector 10a-10d in each detection region 9a-9d. The reliability judgment means 12 implements the judgment of reliability of motion vectors in each region, and delivers such a motion vector, which has been judged to be reliable, to the median selection means 11 and memory 13. The memory 14 stores a set of motion vectors in detection regions, which have been judged to be reliable, and the output motion vectors of a first precedent field and a second precedent field which precedes a present field by two. (Hereinbelow a field immediately precedent to a present field is called as "first precedent field", and a field immediately precedent to the first precedent field is called as "second precedent field".) The memory 13, in case one motion vector has been judged to be reliable in the detection regions in a present field, holds the motion vector until a field which is later than the present field by two. The median selection means 11 produces an output motion vector of the whole field on the basis of the outputs of the reliability judgment means 12, memory 13 and memory 14 in the following manner. It is herein noted that the above-referred table is such as defining 64 displaces by 64 horizontalwise detection pixels (i = 31 −0 − +8) and 16 verticalwise detection lines (j = 7 −0 −8). For the reliability judgment of motion vectors, a reference may be made to JP-A-61-269475. Specific examples of such reliability judgment means are contained, for example, in JP-A-61-269475 (incorporated by reference herein) or Japan Imaging Technology (1989) "Intelligent Digital Image Stabilizer" by K. Uomori et al (also incorporated by reference herein). With reference to these documents and instant FIG. 8, the following explanation is provided of the reliability judgment means.

FIG. 8 shows change of correlation value with change of coordinate in a representative point matching method. Usually, the change of correlation value includes a sharp minimum point as shown by curve (a) and the position of the minimum value gives a motion vector. In contrast, curve (b) in FIG. 8 represents the correlation change in the case of low level image signals and lesser image patterns, with the result of degrading the accuracy of the motion vector detection.

In case a plurality of moving object images (inclusive of moving background portions) appear in the image detection regions on which the correlation operation is effected, for example, in case the image detection regions have their background images moved in one direction in the regions, the minimum correlation value resulting from the correlation operation increases as shown by curve (c) in FIG. 8 with entry of another moving object (for example, a car) moving in the detection regions or with the entry of two or more persons moving in different directions respectively in the detection regions.

The following condition is set with respect to correlation values in order to discriminate or judge the above-mentioned cases:

(A) average value $>\alpha$ (b) an average value $-$(minimum value) $\times\beta>0$ (C) gradient $>\gamma$ wherein $\alpha\gamma$ indicate given threshold values, and $\beta$ indicates a given coefficient. By checking each of the motion vector detection regions as to these conditions, the motion vector of each region is discriminated as invalid (i.e., unreliable) if it does not satisfy these conditions and is discriminated as proper or reliable as the image motion vector of the whole frame image or entire display image if it satisfies the above conditions, whereby the image motion vector of the entire display image (of all the detection regions) is determined by using only motion vectors obtained from reliable regions.

FIG. 7A illustrates the motion of a background image due to fluctuation of the television camera, where image motion vectors are identical vectors at the respective image positions and accordingly identical in the respective detection regions. In the case of FIG. 7A, an average value of correlation values calculated with respect to the detection regions becomes larger than a fixed value due to high image contrasts of the detection regions, and the minimum value of the correlation values becomes low since moving objects of different motion from that of the background images do not appear in the detection regions. Under these conditions, the motion vectors detected from the respective detection regions are proper as a motion vector of the whole frame (hereinbelow "whole frame" is denominated as "entire display image") and are judged as reliable (or valid).

In contrast, FIG. 7B illustrates the motion of moving object images appearing additionally to the background image moving due to fluctuation of the television camera. In this case, an average value of correlation values calculated with respect to the respective detection regions also becomes larger than a fixed value due to high image contrasts of the detection regions, while the minimum value of the correlation values becomes large due to the appearance of the moving object images with different motions from that of the background image. Under these conditions, motion vectors detected from detection regions with the appearance of such moving objects are not proper as a motion vector of the entire display image and are judged as unreliable (invalid). These reliability judging techniques are similar to or like those shown in JP-A-61-269475 discussed above.

First, in case the total number of motion vectors in the detection regions which have been judged to be reliable in a present field is three or more, a median of a set of the reliable motion vectors (the value of a magnitude center of the motion vectors, or the mean value of two motion vectors nearest to the magnitude center of the motion vectors in case the number of them is even) is outputted by the median selection means 11. For example, the median output of "5, 7, 7" is "7", the median of "$-10$, 7, 7" is "7" and the median of "7, $-10$, 7" is "7". Such vectors are treated for their values independently in the horizontal direction and vertical direction, and the output vector is represented by the median of each set.

In case the total number of motion vectors judged to be reliable in the detection regions in the present field is two, it is proposed to use the two motion vectors (vector values) as elements of a set of inputs to the median selection means 11 (or so-called median filter and hereinbelow it is so denominated) and add the elements of the set with an output motion vector (value) of the filter outputted in the first precedent field. Thus, the addition results in using totally the three elements of the set of the inputs to the selection means 11.

In case a single motion vector has been judged as reliable in the detection regions in a present field, it is proposed to use the single motion vector as an element of the set of inputs to the median filter and to add the set with output motion vectors of the median filter outputted in first and second precedent fields as additional elements of the set. Thus, the elements of the set of the inputs to the filter are composed of totally the three motion vectors, and the filter outputs a median of the values of the three motion vectors.

However, even if such a single motion vector judged as reliable in the detection regions continues over three field or more, motion vectors in the detection regions which have been judged to be reliable in the first precedent field and the second precedent field (instead of the above two output motion vectors of the median filter outputted in the first and second precedent fields) are added as elements of the set of inputs to the median filter. Thus, the totally three inputs representative of these motion vector values are inputted to the filter, and a median of them is outputted. This is done in order to prevent such a malfunctioning in which after consecutive outputs of a same value from the filter for two fields, for example, the same value would be outputted continuously in the successive fields without the solution of this invention. Namely, under a continued state of a single motion vector judged as reliable in the detection regions over several fields, if the filter output motion vectors of the first precedent field and the second precedent field are added as elements of the set of the inputs to the median filter so as to use the three elements of the set, such a malfunctioning will be caused.

In the case of image signals sequentially generated causing the reliability judging means 12 to judge as reliable only one of the detected motion vectors, the median selection means 11 switches its operation for a first image condition that only one of the detected motion vectors is judges reliable by the judging means in a present field, but the number of those detected in the just-one precedent field is not one, and for a second image condition that only one of the detected motion vectors is judged reliable over more than two fields. This switching operation of the median selection means 11 occurs for the following reason.

Figure 9:
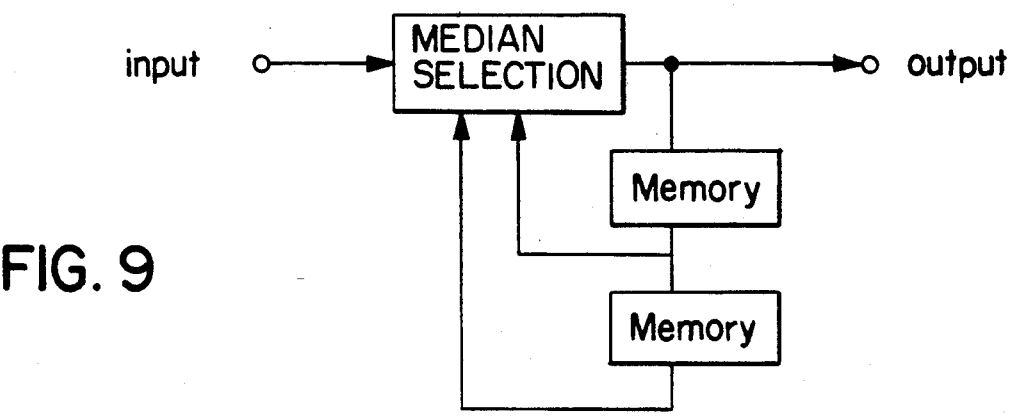
FIGS. 9 and 10 illustrate filter arrangements for feeding back motion vectors to the median selection means.

With respect to the filter arrangement, as shown in FIG. 9, for feeding back output vectors before one field and before two fields in order to combine them with an input vector in a present field to thereby output a median of the combined three vectors (this filter operation gives the operation of the median selection means 11 for the above-mentioned first image condition), when checking the filter output, the following matters can be seen.

In the case of an input vector of a present field taking a vector value between those of output vectors before one field and before two fields, the input vector is outputted as the resultant output.

In the case of the present field input vector larger than both output vectors before one field and before two fields, a larger one of the two vectors is outputted as the resultant output.

In the case of the present field vector smaller than both output vectors before one field and before two fields, a smaller one of the two vectors is outputted as the resultant output.

Thus, in all the cases the resultant output takes only a vector value between such output vectors before one field and before two fields or equal to any one of the two vectors.

Further, in the sequence of input image signals causing the sequential production of equal output vectors before two sequential fields, the resultant output is continuously outputted for the subsequent fields independently of the output values. (Since the purpose of the filter is to eliminate error vectors irregularly generated in short periods in sequential input vectors, such a continuous outputting of the resultant output is naturally improper).

Figure 10:
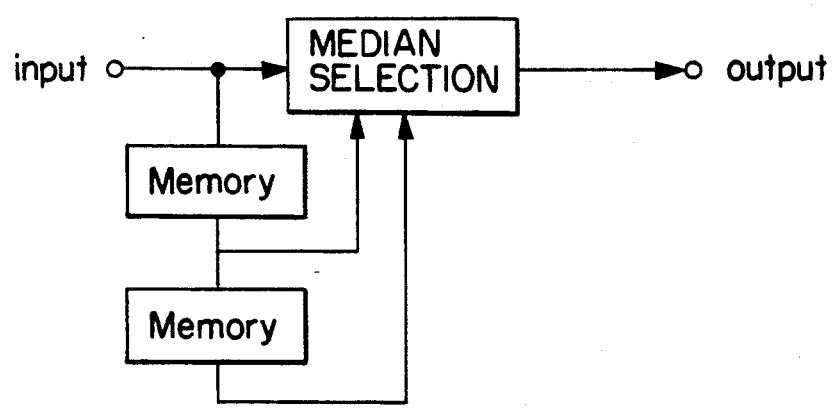
Figure 11:
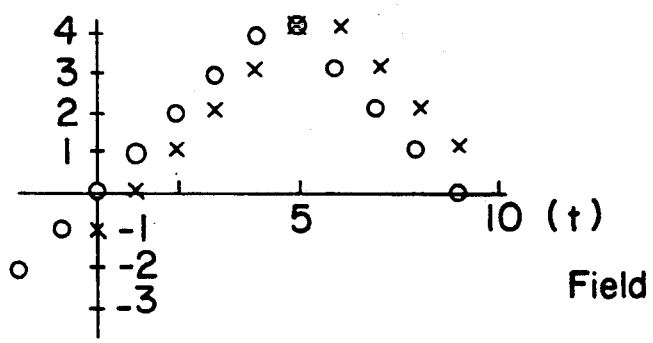
FIG. 11 shown illustrative vector waveforms.

In order to avoid such improper operation, a further filter arrangement is proposed as shown in FIG. 10 for combining a present field input vector with input vectors before one field and before two fields in order to output a median of the three input vectors (this is the operation of the median selection means 11 in the case that the reliability judging means continually judges only one motion vector as reliable over more than two fields). Assuming, for example, that vectors are inputted with a waveform as shown in FIG. 11 (also assuming that the input vector before one field to the initial state and the input vector before two fields thereto take the values of "−1" and "−2", respectively), the filter produces most of the outputs to be delayed by one field relative to the inputs. Thus, it is possible to avoid the improper fixed outputting operation of the filter first mentioned above. Therefore, the median selection means 11 needs to switch its operation according to the conditions of input image signals.

In case no motion vectors are judged as reliable by the judgment means 12 in a present field, the median filter is adapted to use values of "entire display image motion vectors" outputted from the filter in the first and second precedent fields. Namely, a set of three vectors in total are also used to produce and output the present median of the set of vectors, wherein the three vectors are "entire display image motion vectors" thus outputted in the first and second precedent fields respectively, and a vector value obtained by multiplying that outputted before one field with a coefficient less than "1".

Thus, the above three vectors are used as the elements of the set of inputs to the median filter, which outputs a median of the three elements.

As mentioned above, by using such three elements of the set of the inputs to the median filter and producing the median of them, even if one of the elements is a false vector (which is defined as a motion vector having a vector value different from that of the motion vector of the background image due to influences of noise or moving object images other than the background image of an input image signal), but with the remaining two elements being reliable vectors (which represent a motion vector of a whole frame image not affected by partial motions of the image), or which are properly corresponding to motion of the entire display image (background image) without being influenced by noise or such moving object images of the signal, then it is possible for the median filter to selectively output a quite accurate vector value without being affected by the false vector at all.

Only in the case where the total number of motion vectors which have been judged to be reliable in the detection regions in the present field is less than three does the median filter output whole frame image motion vectors (i.e., motion vectors of the entire display image) of precedent field(s) before the present field or motion vectors judged as reliable in the detection regions in such precedent fields are added as possible elements of the set of the inputs to the median filter. Thus, the set of inputs to the median filter is composed of totally three elements, and a median of the input values is outputted. The probability of occurrence of a time lag in outputting the median as representing the entire display image vector is very low.

For example, assuming the case of two motion vectors judged reliable in the detection regions in a present field, when both of the two motion vectors are "correct" (or proper) motion vectors (i.e., those corresponding to motion of the background image and having vector values with little differences from that of the motion vector of the background image), they should have substantially equal values. Hence, the selection of a medium of the set of the inputs to the filter resulting after the addition of the filter output motion vector in the precedent field to such a set will result in a section of a proper value of the output motion vector corresponding to the motion of the background image and having little difference therefrom in the present field, and a time lag does not occur in outputting the signal of an entire display image motion vector as the resultant output. If one of the two motion vectors is such a false vector which is largely deviated from such a proper motion vector in the present field, the filter output motion vector on the precedent field is added as elements of the set of the inputs to the filter which include the two motion vectors. By the selection of the median of the set of the inputs, the filter can output either a "proper" (signal) value of the motion vector (corresponding to motion of the background image and having little error from the vector value thereof) in the present field or such an output vector value in the precedent field which is close to the correct value. Thus, it is possible to remove influences of false vectors from these output vector values.

Figure 1:
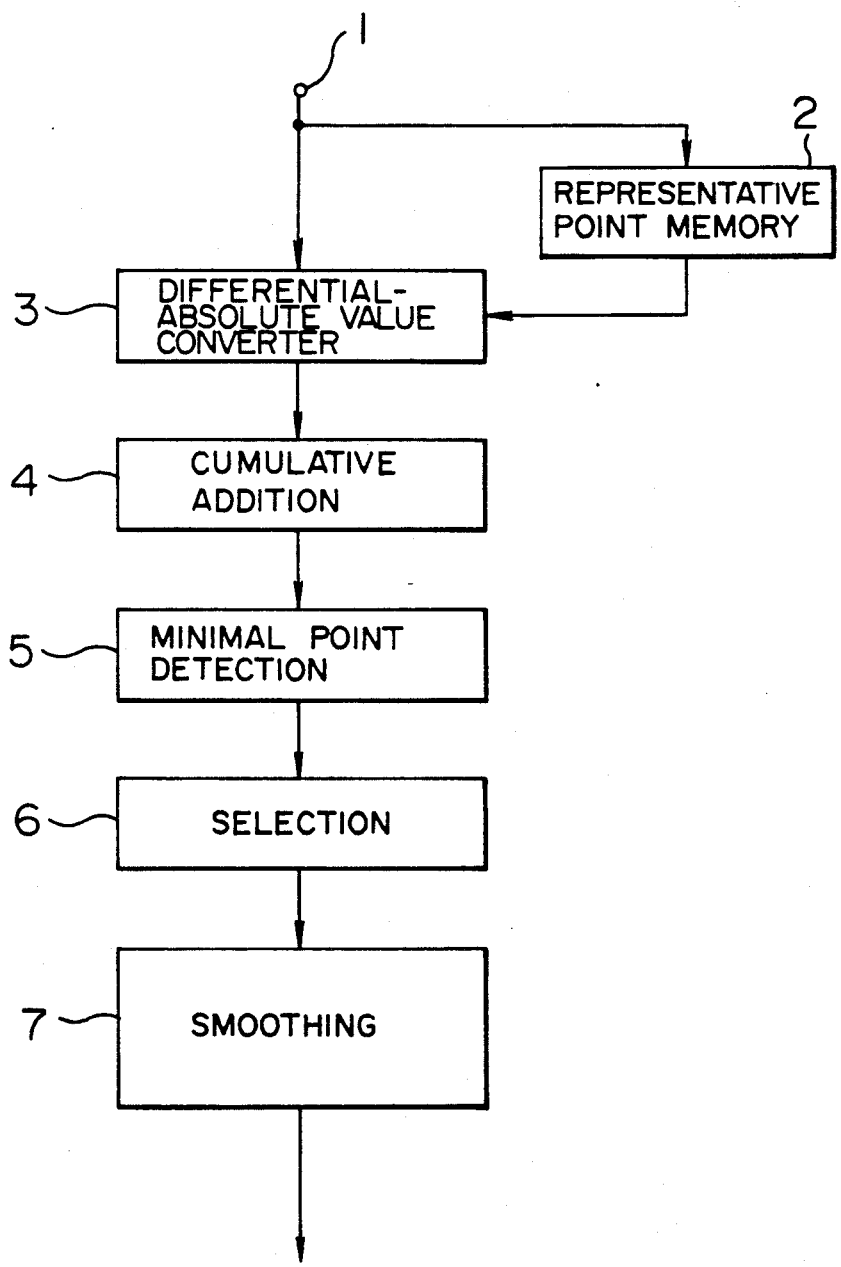
FIG. 1 is a block diagram of the conventional image motion vector detection apparatus.
Figure 2:
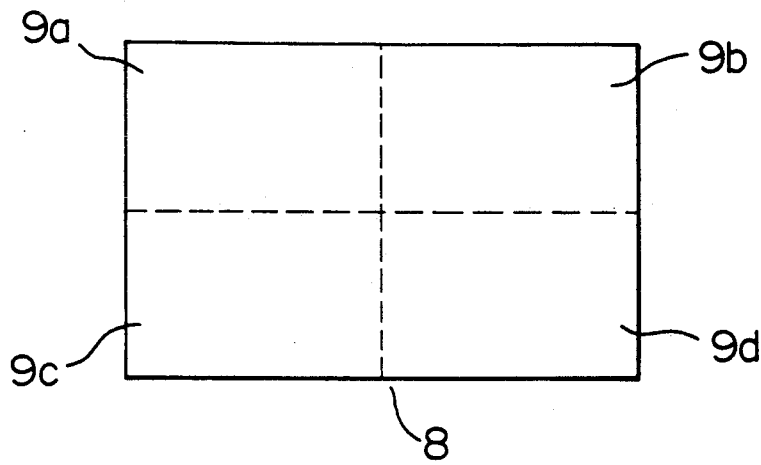
FIG. 2 is a diagram explaining the operation of the above conventional apparatus.
Figure 3A:
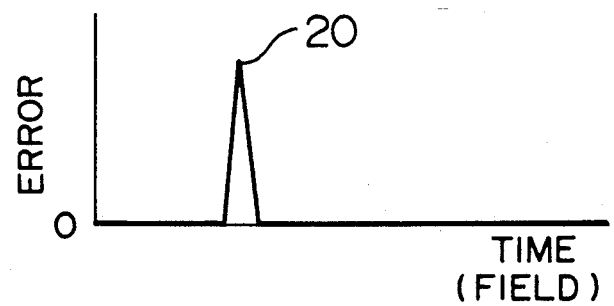
FIGS. 3a-c are diagrams explaining the operation of the above conventional apparatus as a fluctuation stabilizer.
Figure 3B:
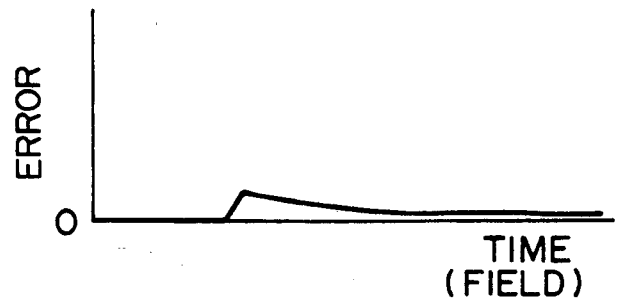
Figure 3C:
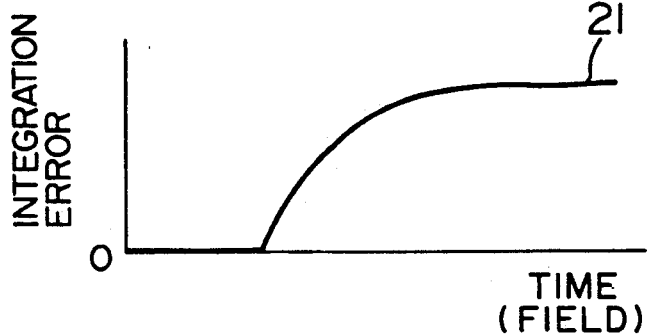
Figure 5:
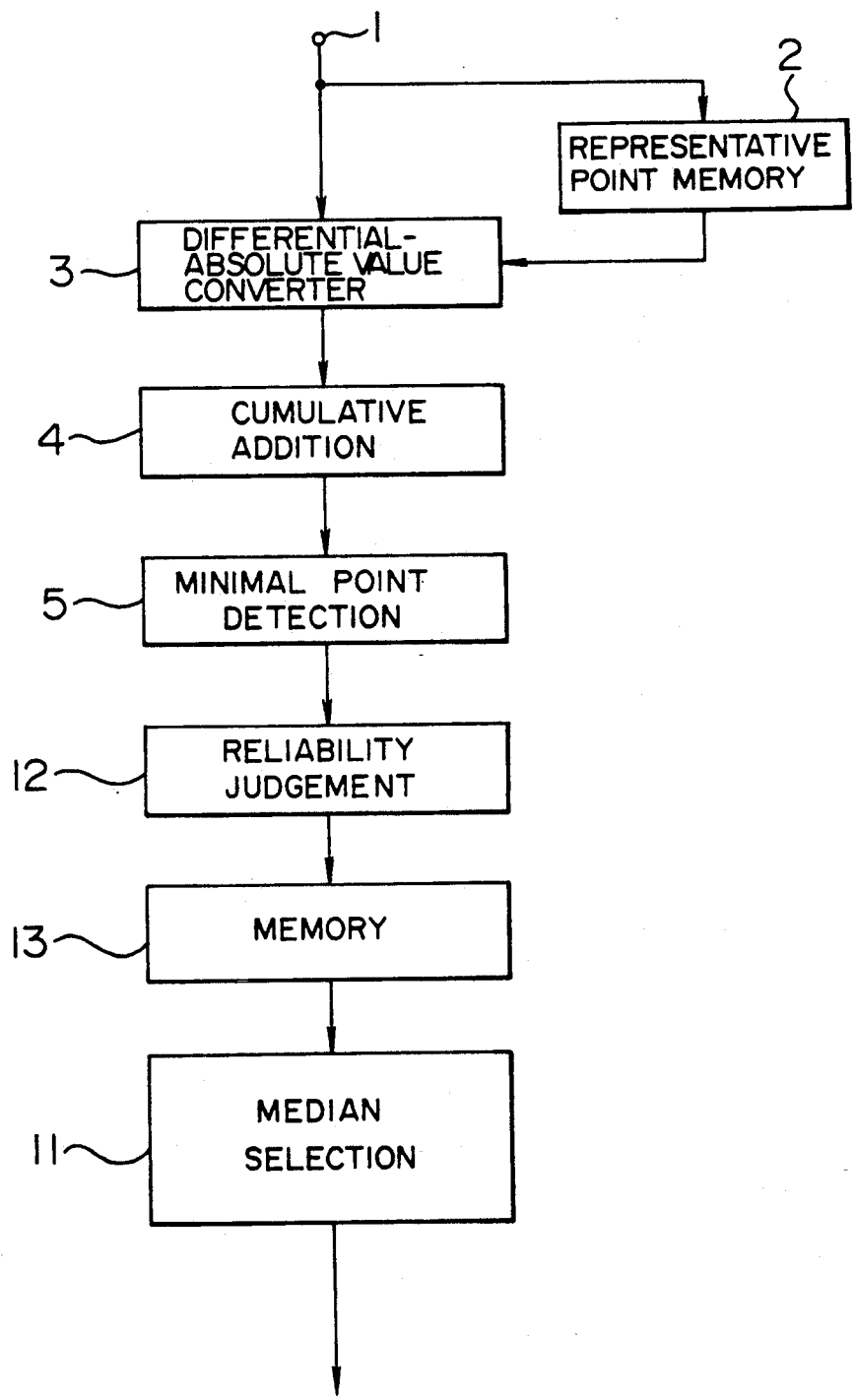
FIG. 5 is a block diagram of an image motion vector detection apparatus based on the second embodiment of this invention.

FIG. 5 is a block diagram of another image motion vector detection apparatus based on the second embodiment of this invention. In FIG. 5, numeral 1 is an image signal input terminal, 2 is a representative point memory, 3 is a differential-absolute value converter, 4 is an accumulating adder, 5 is a minimal point detection circuit 11, is a median selection means, 12 is a relaibility judgment means, and 13 is a memory. In FIG. 5 circuit portions common to those of FIG. 1 are referred to by the same reference numerals. This image motion vector detection apparatus will be explained in the following.

The arrangement and operation of portions including the image signal input terminal 1, representative point memory 2, differential-absolute value converter 3, accumulating adder 4, minimal point detection circuit 5, and reliability judgment means 12 are identical to the first embodiment. Subsequently, the reliability judgment means 12 implements the judgment of reliability of motion vectors in all regions, and motion vectors which have been judged to be reliable are outputted to the memory 13. The memory 13 stores four vectors in the order or sequence outputted from the reliability judgment means 12, and outputs the four vectors to the median selection means 11. The median selection means 11 outputs a median of the set of four vectors as a motion vector of the frame.

According to this embodiment, in which the median of the set of four vectors is outputted as a motion vector of the frame, even if one of the elements of the set if a false vector having a vector value largely different from those of other element vectors representing a motion vector of the background image due to noise or moving object images of different motion from that of the background image of the image signal, the medium filter outputs the resultant motion vector value of the entire display image without being influenced by the false vector. Thus, the filter output can be accepted as a correct or proper motion vector of the entire display image having eliminated influences of image noise or moving object images of different motion from the background image motion.

In case the number of vectors provided by the reliability judgment means 12 for the present field is four, all of the four vectors provided by the memory 13 have been detected in the present field, and therefore the output made of the median of the set of four vectors does not involve a time lag.

Even in case the number of vectors provided by the reliability judgment means 12 for the present field is less than four, the number of vectors is increased to four by adding to them vectors provided by the reliability judgment means 12 before the present field, so that the median of the four vectors is outputted as a motion vector of the frame without influences of such a false vector having a vector value which differs greatly from those of other elements of motion vectors due to image noise or moving object images of different motion from the background image.

Accordingly, an effectiveness which is almost identical to the first embodiment can be accomplished more simply.

Figure 6:
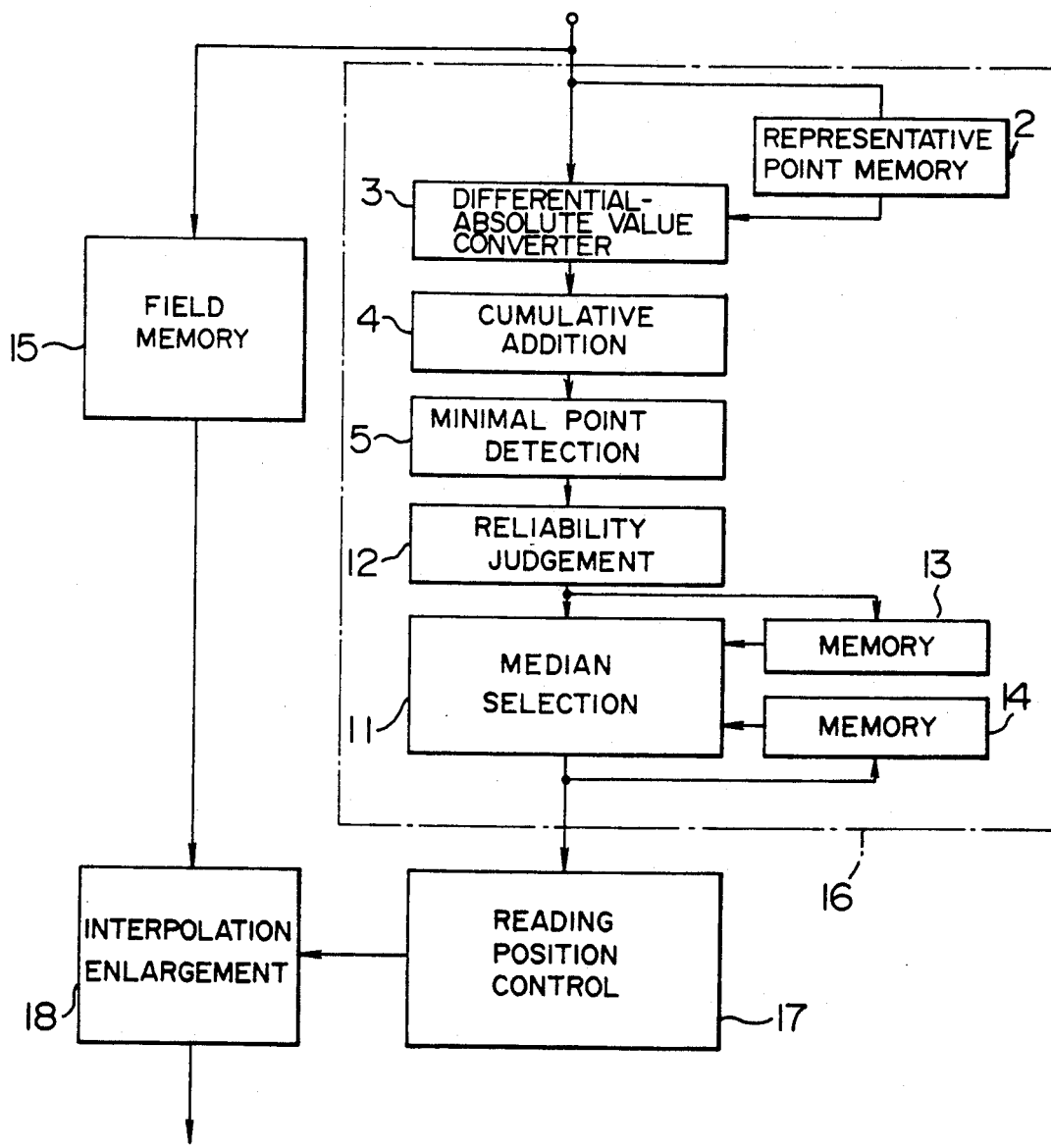
FIG. 6 is a block diagram of an image fluctuation stabilizer based on the third embodiment of this invention.

FIG. 6 is a block diagram of an image fluctuation stabilizer according to the third embodiment of this invention. In FIG. 6, numeral 1 is an image signal input terminal, 2 is a representative point memory, 3 is a differential-absolute value converter, 4 is an accumulating adder, 5 is a minimal point detection circuit, 11 is a median selection means, 12 is a reliability judgment means, 13 and 14 are memories, 15 is a field memory, 17 is a reading control means, and 18 is an interpolation-enlargement means. In FIG. 6, circuit portions which are the same as those of FIG. 4 are referred to by the same reference numerals. An arrangement including the representative point memory 2, differential-absolute value converter 3, accumulating adder 4, minimal point detection circuit 5, median smoothing means 11, reliability judgment means 12, and memories 13 and 14 is a motion vector detection means.

The operation of the image fluctuation stabilizer arranged as described above is as follows.

First, an image signal is applied from the input terminal 1. The field memory 15 stores the image signal for one field.

The motion vector detection means 16, which is identical in arrangement and operation to the first embodiment and the motion vector detection means of FIG. 4, detects a motion vector of the whole frame image in a present field relative to the precedent field, and outputs a signal of the vector to the reading control means 17.

The reading control means 17 responds to the entered motion vector signal to shift the memory reading position in a direction for correcting or adjusting the movement relative to the reading position for a first precedent field, and performs such processings as centering and clipping so that the reading position does not go out of the frame, and outputs the result to the interpolation-enlargement means 18.

The interpolation-enlargement means 18 reads out image signals of a portion specified by the entered reading position from the field memory 15, and implements the enlarged interpolation for the readout image signals to output as image signals for one frame. These means may be implemented, for example, with reference to article "Picture center correction" written on pages 43 to 48 by Japanese TV Society Technical Report dated May 28, 1987 (incorporated by reference herein);

FIGS. 7A and 7B are simple illustrations of frames used to explain in more detail the above determination of the motion vector of the entire display image from motion vectors detected from the detection regions. In FIGS. 7A and 7B, 8 is a frame, 9a, 9b, 9c and 9d are a plurality of motion vector detection regions included in the motion vector detection means 16, and 10a, 10b, 10c and 10d are motion vectors detected in the respective regions. 19a, 19b and 19c are moving objects in the frame having movements different from the movement of whole image in the frame.

FIG. 7A shows a frame displaying no moving object images of different motion from that of the background image which is caused due to possible unintentional or uncontrolled movements, shaking or fluctuations of the television camera. In this case, the motion vector detection means 16 judges that all vectors 10a, 10b, 10c and 10d detected in the respective detection regions 9a, 9b, 9c and 9d are reliable, the reliability judgments are done in like manner as in the first embodiment, and a median among them is outputted as an output motion vector of the frame. Accordingly, even in case one of the detected vectors 10a, 10 b, 10c and 10d is such a false vector as mentioned above, a motion vector of the background image can be correctly detected by being rid of influences of noise in images or moving object images of different motion from that of the background image. Thus, a satisfactory corrected stabilized frame is presented. In case there are no moving objects in the frame, as shown in FIG. 7A, even a small residual of non-correction or non-stabilization of fluctuations of the whole image frame can be easily visually noted, causing unnatural impressions to viewers. Namely, a sudden and slight amount of motion of the entire display (whole frame image) is generated as a result of correction error in correcting motions or fluctuations of the entire image to be of a stationary stabilized state without moving image portions thereof, and it is of a kind not generated under usual image conditions. Therefore, it will give unnatural impressions to observers. In the above case, however, the motion vector provided by the motion vector detection means 16 has no time lag, and therefore there arises no residual of correction due to a time lag in the stabilized frame.

FIG. 7B shows a frame displaying many moving objects having respective motions different from the motion of the background image due to possible unintentional or uncontrolled movement or shaking of the television camera. In this case, due to moving objects 19a, 19b and 19c, the motion vector detection means 16 judges that only a vector 10d among vectors 10a–10d detected in the respective detection regions 9a–9d is reliable. The reliability judgments are done in like manner as in the first embodiment. By using, as the elements of the set of the inputs to the median filter, the vector 10d, the filter output motion vectors of the first precedent field and the second precedent field or motion vectors in respective detection regions which have been judged reliable, the median filter outputs a median of the elements of the set as a motion vector of the frame. Accordingly, even if the vector 10a detected in the present field is a false vector as mentioned above (having a vector value largely different from those of other elements of the set due to image noise or moving object images of different motion from that of the background image), it becomes possible for the median filter to output a motion vector of the entire display image without being affected by image noise or such moving object images by using the three elements of the set of the inputs to the median filter by adding as one of the three elements the vector element obtained differently from such a false vector as mentioned above although not obtained from the present field. Thus, a very well corrected stabilized whole frame image (entire display image) can be presented stabilized frame is presented. In this case, however, the motion vector produced by the motion vector detection means 16 may possibly have a time lag, and this results in non-stabilized fluctuation residual of high frequency components due to the time lag in the fluctuation stabilized frame. However, in case many moving objects images are produced in the frame, as shown in FIG. 7B, a small residual of instabilization is hardly recognized on the stabilized frame and therefore it does not cause unnatural visual feelings to viewers.

As described, according to this embodiment, only in case the number of motion vectors of regions which have been judged to be reliable in a present field is less than a specified number, output motion vectors of precedent fields inclusive of a first precedent field or motion vector judged reliable in regions of such precedent fields are added to produce a set of motion vectors a number of which becomes a specified number or more and a representative vector value in the set is outputted by the median selection means 11, whereby the influence of errors caused by a false vector is suppressed to a low level, and non-stabilized fluctuation residual occurs only in the case of the drastic movement of moving objects in the frame or in the case of a large degree of noise. In this case, such a small fluctuation residual hardly causes any unnaturalness in the visual observation. On the other hand, in the case of a lesser number of moving objects and less noise in the frame, in which such small fluctuation residual can easily be noted, the fluctuations can be stabilized sufficiently low, whereby a satisfactory stabilized image can be presented for all conditions of various moving images.

Although in the third embodiment the motion vector detection means 16 is arranged identically to the motion vector detection apparatus of the first embodiment, it is obvious that the means is arranged identically to the motion vector detection apparatus of the second embodiment to achieve the same effectiveness.

Although in the first, second and third embodiments there are four detection regions provided in the frame, the number of regions may be other than four.

Although in the first, second and third embodiments the minimum number of motion vectors to produce the median by the median selection means 11 is three and four, respectively, a different number of such vectors above three may be adopted.

Although in the first, second and third embodiments the median selection means 11 outputs the median as a representative value, it may be designed such that motion vectors distant from the general trend of such a set are excluded from the set and a representative value is determined from the remaining motion vectors. For example, assuming a set of eight motion vectors, values of four of them closer to the magnitude center of them are averaged to produce a representative value of the set. Alternatively, in selecting four vectors from among a set of eight motion vectors, they are selected such that the sum of the distances between the selected four vectors is minimal, and a mean value of the four vectors is outputted as a representative value of the set.

Although in the first, second and third embodiments the motion vectors produced in a first precedent field and the like are added in the case the number motion vectors judged as reliable in the detection regions in a present field is less than three, a motion vector of the present field predicted from such outputs of the first precedent field and the second precedent field may be added to produce the vector set. For example, an added vector may be produced by subtracting the output vector the second precedent field from the output vector multiplied by two of the first precedent field may be added to the set.

Although in the first, second and third embodiments the representative point memory 2, differential-absolute value converter 3, accumulating adder 4 and minimal point detection circuit 5 are used to detect a plurality of motion vectors of two consecutive fields by "a so-called representative point matching method" and by providing a plurality of detection regions in one frame, and the detected results are supplied to the median selection means 11 and memory 13, they may be replaced with other means capable of detecting a plurality of motion vectors. For example "a so-called all-point matching method" or "gradient method" may be used in place of the representative point matching method.

As mentioned above, the image motion vector detection apparatus of this invention determines a representative value of a set of motion vectors by removing those distant from the general trend of the set, whereby the apparatus is highly effective for eliminating the influence of possible false or unreliable vectors in the set. Also, the apparatus determines a representative value from among motion vectors when the number of motion vectors judged as reliable in a present field is more than a predetermined number, whereby a time lag does not arise in the output motion vector. Further even if the number of motion vectors judged as reliable in the present field is less than the predetermined number due to moving objects and noises in the frame, motion vectors are suppremented by using motion vectors in regions, which have been judged to be reliable, and output vectors of precedent fields thereby to determine a representative value among them, whereby the apparatus is highly effective for eliminating influences of a false vector included in the set.

Accordingly, the motion vector produced by the apparatus has its errors minimized and its time lag suppressed thoroughly in all conditions of even varying images, whereby it is highly effective in achieving a satisfactory result when used for such image processings as motion correction and coding and for the control of other items of equipment.

The image fluctuation stabilization apparatus of this invention uses the above-mentioned inventive image motion vector detection apparatus, whereby the residual of non-stabilization of high frequency components of fluctuations arises only in the case of drastic movement of moving objects in the frame or significant noises, and a small residual fluctuation of these cases does not significantly cause unnatural visual preceptions with the picture frame. Also, in case even a small residual fluctuation is easily noted by viewers, accurate correction can be implemented up to a high frequency components of fluctuations. Accordingly, a satisfactory fluctuation-stabilized image can be produced in all conditions of image variations.

We claim:

1. An image motion vector detection apparatus, comprising:

representative image memory means for storing portions of each field of an image signal inputted precedently in time sequence in correspondence with image subregions of a whole frame image region corresponding to said image signal such that said stored portions of said precedent image signal are employed for detection of plural image motion vectors of said whole frame image region of said image signal continuously inputted;

image motion vector detection means for detecting on each of said image subregions correlation values between precedent image signals stored in said memory means and image signals inputted subsequent to said precedent image signals by accumulation of differential absolute values of said precedent image signals and the subsequently inputted image signals in order to detect a value of an image motion vector of each of said image subregions from the detected correlation values;

reliability judging means for judging a reliability of a respective image motion vector of each of said image subregions as to whether the detected value of the respective image motion vector is reliably proper in order to correct the inputted image signal against fluctuations possibly caused therein, said judging means outputting a signal representative of the detected value of the respective image motion vector when it is judged reliably proper; and signal processing means including median value selection means for receiving from said judging means a set of input signals representative of image motion vector values judged reliably proper by said judging means among those values detected respectively on said image subregions and outputting a median signal having a median value of the image motion vector values of the received set of signals as a signal representing an image motion vector of the whole frame image region, said signal processing means checking the total number of image motion vectors judge reliably proper by said judging means with respect to said image subregions of a current field of the image signal and adding said set of input signals received by said median value selection means with at least one of said signals representative of image motion vector values judged reliably proper by said judging means of representative of resultant values of arithmetic processing thereof before the current field of the image signal, when said total number of image motion vectors judged reliably proper is lower than a predetermined number.

2. An image motion detection apparatus according to claim 1, wherein said signal processing means adds, for said total number of image motion vectors lower than said predetermined number, said set of input signals received by said median value selection means with at least one outputted signal having a median value of the image motion vector values of the received set of signals which was outputted to represent an image motion vector of an entire field image region of the image signal of at least one field or frame preceding to the current field.

3. An image motion detection apparatus according to claim 1, wherein said signal processing means adds, for said total number of image motion vectors lower than said predetermined number, said set of input signals received by said median value selection means with at least one signal of an image motion vector which was judged reliably proper with respect to a corresponding one of said image subregions of the image signal of at least one field or frame preceding to the current field.

4. An image motion detection apparatus according to claim 1, wherein said predetermined number is an integer not smaller than 3.

5. An image motion detection apparatus according to claim 2, wherein said predetermined number is an integer not smaller than 3.

6. An image motion detection apparatus according to claim 3, wherein said predetermined number is an integer not smaller than 3.

7. An image fluctuation correction system comprising:

(a) memory means for temporarily storing portions of an input image signal;

(b) interpolation means for interpolating partially the stored image signal portions to enlarge a partial image of said input image signal;

(c) an image motion detection apparatus for detecting an image motion vector of the input image signal, said apparatus comprising:

representative image memory means for storing portions of each field of an image signal inputted precedently in time sequence in correspondence with image subregions of a whole frame image region corresponding to said image signal such that said stored portions of said precedent image signal are employed for detection of plural image motion vectors of said whole frame image region of said image signal continuously inputted;

image motion vector detection means for detecting on each of said image subregions correlation values between precedent image signals stored in said memory means and image signals inputted subsequent to said precedent image signals by accumulation of differential absolute values of said precedent image signals and the subsequently inputted image signals in order to detect a value of an image motion vector of each of said image subregions from the detected correlation values;

reliability judging means for judging a reliability of a respective image motion vector of each of said image subregions as to whether the detected value of the respective image motion vector is reliably proper in order to correct the inputted image signal against fluctuations possibly caused therein, said judging means outputting a signal representative of the detected value of the respective image motion vector when it is judged reliably proper; and signal processing means including median value selection means for receiving from said judging means a set of input signals representative of image motion vector values judged reliably proper by said judging means among those values detected respectively on said image subregions and outputting a median signal having a median value of the image motion vector values of the received set of signals as a signal representing an image motion vector of the whole frame image region, said signal processing means checking the total number of image motion vectors judged reliably proper by said judging means with respect to said image subregions of a current field of the image signal and adding said set of input signals received by said median value selection means with at least one of said signals representative of image motion vector values judged reliably proper by said judging means or representative of resultant values of arithmetic processing thereof before the current field of the image signal, when said total number of image motion vectors judged reliably proper is lower than a predetermined number; and (d) control means for controlling memory reading operations to control said interpolation enlargement means and stabilize possible image fluctuations of the image signal in accordance with said detected image motion vector.

8. An image fluctuation correction system according to claim 7, wherein said signal processing means adds, for said total number of image motion vectors lower than said predetermined number, said set of input signals received by said median value selection means with at least one outputted signal having a median value of the image motion vector values of the received set of signals which was outputted to represent an image motion vector of an entire field image region of the image signal of at least one field or frame preceding to the current field.

9. An image fluctuation correction system according to claim 7, wherein said signal processing means adds, for said total number of image motion vectors lower than said predetermined number, said set of input signals received by said median value selection means with at least one signal of an image motion vector which was judged reliably proper with respect to a corresponding one of said image subregions of the image signal of at least one field or frame preceding to the current field.

10. An image fluctuation correction system according to claim 7, wherein said predetermined number is an integer not smaller than 3.

11. An image fluctuation correction system according to claim 8, wherein said predetermined number is an integer not smaller than 3.

12. An image fluctuation correction system according to claim 9, wherein said predetermined number is an integer not smaller than 3.

* * * * *